US011041568B2

(12) United States Patent
Koller et al.

(10) Patent No.: US 11,041,568 B2
(45) Date of Patent: Jun. 22, 2021

(54) QUICK COUPLING WITH MULTI-PIECE ELASTOMER SEAL

(71) Applicant: Parker-Hannifin Corporation, Cleveland, OH (US)

(72) Inventors: Jason Richard Koller, Eden Prairie, MN (US); Carter Fose, Crystal, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 317 days.

(21) Appl. No.: 16/317,654

(22) PCT Filed: Aug. 1, 2017

(86) PCT No.: PCT/US2017/044891
§ 371 (c)(1),
(2) Date: Jan. 14, 2019

(87) PCT Pub. No.: WO2018/034835
PCT Pub. Date: Feb. 22, 2018

(65) Prior Publication Data
US 2019/0285181 A1    Sep. 19, 2019

Related U.S. Application Data

(60) Provisional application No. 62/377,182, filed on Aug. 19, 2016.

(51) Int. Cl.
*F16J 15/3232* (2016.01)
*F16J 15/3264* (2016.01)
(Continued)

(52) U.S. Cl.
CPC ....... *F16J 15/3232* (2013.01); *F16J 15/3264* (2013.01); *F16L 17/025* (2013.01); *F16L 37/32* (2013.01); *F16L 37/56* (2013.01)

(58) Field of Classification Search
CPC .......... F16J 15/18; F16J 15/181; F16J 15/184; F16J 15/189; F16J 15/3232; F16J 15/3264; F16L 17/025; F16L 37/32; F16L 37/56
See application file for complete search history.

(56) References Cited

U.S. PATENT DOCUMENTS

| 4,190,259 A | 2/1980 | Zitting |
| 4,592,558 A | 6/1986 | Hopkins |

(Continued)

FOREIGN PATENT DOCUMENTS

| DE | 914574 | 7/1954 |
| FR | 2321643 | 3/1977 |

(Continued)

OTHER PUBLICATIONS

International Search Report and Written Opinion of PCT/US2017/044981 dated Nov. 7, 2017.

*Primary Examiner* — Gilbert Y Lee
(74) *Attorney, Agent, or Firm* — Renner, Otto, Boisselle & Sklar, LLP (57) ABSTRACT

A novel sealing member and a novel wedging element that may be part of a novel seal assembly. The seal assembly may remain effective for more connection/disconnection cycles as compared to the previously known seals. In exemplary embodiments, the wedging element may engage the sealing member or a pair of the sealing members that sandwich the wedging element. When engaged, an inclined surface of the wedging element may radially compress a radially inwardly extending sealing leg of one or both of the sealing members. A fluid pressure opposite the wedging element relative to the corresponding sealing member may radially expand a radially outwardly extending sealing leg of one or both of the sealing members.

14 Claims, 9 Drawing Sheets

(51) Int. Cl.
*F16L 17/025* (2006.01)
*F16L 37/32* (2006.01)
*F16L 37/56* (2006.01)

(56) References Cited

U.S. PATENT DOCUMENTS

| | | | |
|---|---|---|---|
| 4,635,945 A | 1/1987 | Beck | |
| 4,709,932 A * | 12/1987 | Edlund | F16J 15/3208 277/550 |
| 4,900,071 A | 2/1990 | Smith, III | |
| 5,052,439 A | 10/1991 | Smith, III | |
| 6,305,483 B1 | 10/2001 | Portwood | |
| 6,575,430 B1 | 6/2003 | Smith, III | |
| 6,726,220 B2 | 4/2004 | Grimanis et al. | |
| 6,910,692 B2 | 6/2005 | Malone et al. | |
| 7,604,243 B2 | 10/2009 | Zitting et al. | |
| 7,914,053 B2 | 3/2011 | Keller et al. | |
| 8,087,700 B2 | 1/2012 | Smith, III | |
| 8,317,233 B2 | 11/2012 | Pionke et al. | |
| 8,615,865 B2 | 12/2013 | Vandal et al. | |
| 8,726,936 B2 | 5/2014 | Rusconi et al. | |
| 2004/0012157 A1 * | 1/2004 | Oida | F16L 23/20 277/626 |
| 2009/0200793 A1 | 8/2009 | Smith, III | |
| 2015/0054276 A1 | 2/2015 | Alsup et al. | |
| 2015/0308599 A1 | 10/2015 | Mikulski et al. | |

FOREIGN PATENT DOCUMENTS

| | | |
|---|---|---|
| FR | 2816024 | 5/2002 |
| WO | WO 02063131 | 8/2002 |
| WO | WO 2016178950 | 11/2016 |
| WO | WO 2017069949 | 4/2017 |

* cited by examiner

QUICK COUPLING WITH MULTI-PIECE ELASTOMER SEAL

RELATED APPLICATIONS

This application is a national stage application pursuant to 35 U.S.C. § 371 of PCT/US2017/044891 filed on Aug. 1, 2017, which claims the benefit of U.S. Provisional Application No. 62/377,182 filed Aug. 19, 2016, which are hereby incorporated herein by reference.

FIELD OF INVENTION

The present invention relates generally to fluid seals, and more particularly to multi-piece elastomer seals for quick couplings.

BACKGROUND

Quick couplings are devices that allow connection of a single fluid line without a need for special tools. Individual quick couplings typically have a ball locking mechanism to prevent male and female portions of the quick couplings from separating due to internal hydraulic pressure during use.

Multi-couplings typically utilize a group of quick couplings that have male and female portions mounted together in a corresponding plate or casting. Instead of an individual locking mechanism, such as a ball locking mechanism, a larger centralized locking mechanism may connect and lock the male portions in one plate to the corresponding female portions in the other plate. Increased pressures within the quick couplings increase separation loads and can require additional loads to connect the quick couplings.

Some multi-couplings include a previously known U-ring seal with a U-shaped cross-section. The opening of the U-ring seal may receive a relatively high pressure from one direction to expand the U-ring seal. When expanded, the U-ring seal may engage a cylindrical wall of the male portion to seal against the cylindrical wall.

Other multi-couplings include a previously known sickle-shaped seal with a sickle-shaped cross-section. The opening of the sickle-shaped seal may receive an O-ring to energize the sickle-shaped seal at low temperatures and low pressures. The opening of the sickle shaped seal may also receive a relatively high pressure from one direction to expand the sickle-shaped seal. When expanded, the sickle-shaped seal may seal against an outer cylindrical wall.

Some other multi-couplings include a previously known seal with a radially inward facing ridge. The ridge may include a cavity to receive an O-ring to energize the seal at low temperatures and low pressures. The ridge seals against an outer cylindrical wall of the male portion. When sealing, the ridge compresses radially.

Sub-sea multi-couplings in particular are subject to ambient seawater pressure. When the multi-couplings are disconnected, the seawater pressure can create a pressure imbalance with a high flow potential. The pressure imbalance and the high flow potential can damage the previously known seals, which can render the previously known seals ineffective after 10-30 connection/disconnection cycles.

SUMMARY OF INVENTION

The present invention provides a novel sealing member and a novel wedging element that may be part of a novel seal assembly. The seal assembly may remain effective for more connection/disconnection cycles as compared to the previously known seals. In exemplary embodiments, the wedging element may engage the sealing member or a pair of the sealing members that sandwich the wedging element. When engaged, an inclined surface of the wedging element may radially compress a radially inwardly extending sealing leg of one or both of the sealing members. A fluid pressure opposite the wedging element relative to the corresponding sealing member may radially expand a radially outwardly extending sealing leg of one or both of the sealing members.

The sealing member and wedging element may avoid forming high internal pressure pockets when exposed to high fluid pressure, which may reduce or eliminate the risk of the sealing member fracturing when the male coupling is removed after high pressure usage. Reducing the risk of fracturing may allow the lifespan of the sealing member of the present application to be comparatively longer than the previously known C-shaped seals and sickle-shaped seals, which upon exposure to high fluid pressure often form a high internal pressure pocket that may damage the previously known seals when the external pressure is significantly reduced.

After a female coupling is coupled to the male coupling, the radially inwardly extending sealing leg of the sealing member may be urged radially inward to increase a radially inner sealing force, and the radially outwardly extending sealing leg of the sealing member may be urged radially outward to increase a radially outer sealing force. Increasing sealing forces both radially inwardly and radially outwardly allows two of the sealing members to redundantly seal, which allows one of the sealing members to pick up slack for the other sealing member if necessary. For example, the sealing members may be Z-shaped to axially compress and radially expand when engaged with the wedging element.

When an external pressure is quickly removed from a previously known U-shaped seal or a previously known sickle-shaped seal, the U-shaped seal or the sickle-shaped seal may quickly expand from the high internal pressure. The quick expansion may cause the U-shaped seal or the sickle-shaped seal to fracture. Fracturing of the U-shaped seal or the sickle-shaped seal may render the U-shaped seal or the sickle-shaped seal ineffective, which can cause hydraulic fluid to leak out of the coupling or allow sea water to leak into the coupling. In contrast, the sealing member of the present application may avoid the quick expansion and reduce the likelihood of fracture.

When the cylindrical wall of the male portion of a previously known multi-coupling engages the previously known seal with a radially inward facing ridge, the ridge may permanently radially compress after engaging and disengaging the cylindrical wall multiple times. The radial compression may reduce sealing effectiveness of the ridge, which can cause hydraulic fluid to leak out of the coupling or allow sea water to leak into the coupling. In contrast, the sealing member of the present application may axially compress to increase a radial sealing force to prevent reduction of sealing effectiveness.

The seal assembly of the present application may be retrofit into cavities for previously known U-shaped seals and sickle-shaped seals.

The wedging element may be resilient to repeatedly urge the radially inwardly extending sealing leg of the sealing member inward. For example, the wedging element may be made of the same material as the sealing member. Alternatively, the wedging element may be made from a dissimilar material.

The wedging element may include at least one wedging surface. For example, a pair of the sealing members may sandwich the wedging element, which may include a pair of wedging surfaces that are axially opposite one another.

According to one aspect of the invention, a seal assembly may include a first sealing member circumscribing a longitudinal axis, wherein the first sealing member includes a first central portion extending axially in a first direction from a radially inner end of a first radially outwardly extending sealing leg to a radially outer end of a first radially inwardly extending sealing leg, and wherein the first central portion forms a first wedge engaging surface that faces radially outwardly. The seal assembly may include a wedging element that at least partially circumscribes the longitudinal axis, wherein the wedging element includes a first wedging surface that is engageable with the first wedge engaging surface, and wherein the first wedging surface faces radially inwardly and extends in an inclined manner relative to the longitudinal axis. Wherein when the seal assembly is in an uncompressed state, a radially outermost extent of the first radially outwardly extending sealing leg is axially offset from the entire wedging element and the first wedging surface is engaged with the first wedge engaging surface. Wherein when the seal assembly is in a radially compressed state, a radially innermost extent of the first radially inwardly extending sealing leg is radially outward of a position of the radially innermost extent when the seal assembly is in the uncompressed state. Wherein when the seal assembly is in the radially compressed state and the first sealing member and the wedging element are urged together, the wedging element engages the first wedge engaging surface to urge the first radially inwardly extending sealing leg radially inwardly. Whereby when a pressure urges the sealing member in the first direction, an axial length of the seal assembly is reduced, the pressure is proportional to a radially inward sealing force of the first radially inwardly extending sealing leg, and the pressure is proportional to a radially outward sealing force of the first radially outwardly extending sealing leg.

According to another aspect of the invention, a wedging element includes a first wedging surface that at least partially circumscribes a longitudinal axis and that extends in an inclined manner relative to the longitudinal axis, a second wedging surface extending axially away from the first wedging surface, at least partially circumscribing the longitudinal axis, and extending in an inclined manner relative to the longitudinal axis. Wherein the wedging element is resilient, thereby allowing the first wedging surface and the second wedging surface to expand radially outwardly when a radially outward force urges the wedging surfaces radially outwardly, and after being expanded allowing the first wedging surface and the second wedging surface to retract radially inwardly when the radially outward force is reduced.

According to another aspect of the invention, a sealing member includes a radially outwardly extending sealing leg, a central portion extending axially in a first direction from a radially inner end of the radially outwardly extending sealing leg. Wherein the central portion forms a wedge engaging surface that faces radially outwardly and extends in an inclined manner relative to a longitudinal axis, and a radially inwardly extending sealing leg. Wherein the central portion extends to a radially outer end of the radially inwardly extending sealing leg. Wherein the central portion and the sealing legs circumscribe the longitudinal axis. Wherein the sealing legs are resilient, thereby allowing the sealing legs to resiliently flex relative to the central portion when energized.

The foregoing and other features of the invention are hereinafter described in greater detail with reference to the accompanying drawings.

DETAILED DESCRIPTION

The principles of this present application have particular application to seal assembly components for female coupling components for hydraulic systems, and thus will be described below chiefly in this context. For example, the female coupling components may connect hydraulic control lines. It will be appreciated that principles of this invention may be applicable to other fluid systems where it is desirable to prevent leakage of fluid.

Figure 1:
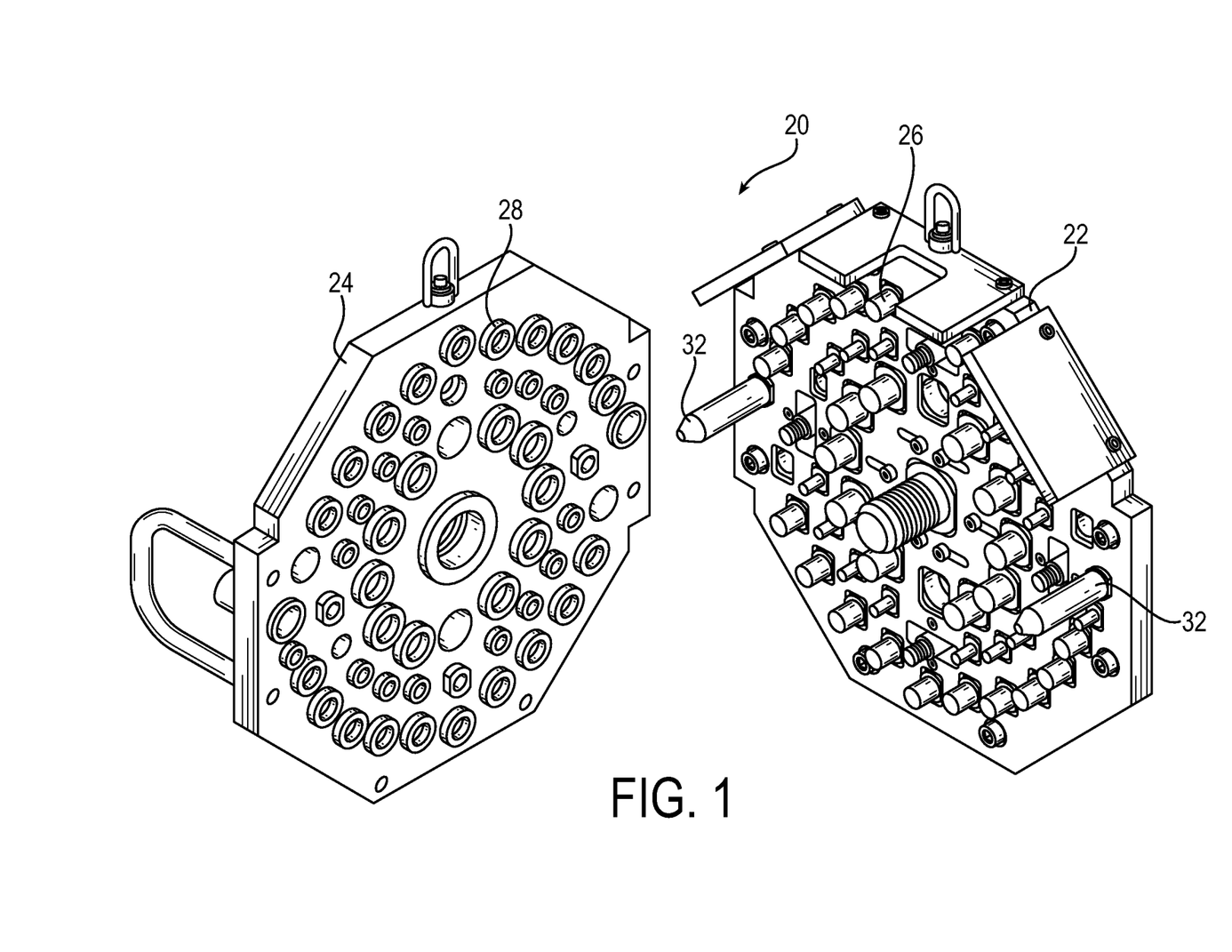
FIG. 1 is a perspective view of a multi-coupling holding a plurality of exemplary male coupling components and female coupling components.

Referring now to the drawings and initially to FIG. 1, a multi-coupling is designated generally by reference numeral 20. The multi-coupling 20 can be provided, for example, as part of a hydraulic system (not shown) for sub-sea hydraulic applications, such as providing hydraulic fluid to sub-sea oil wells. The multi-coupling 20 may include a fixed plate 22 and a free plate 24 for securing a plurality of male coupling components 26 and a plurality of female coupling components 28, respectively. The female coupling components may include a clam shell retainer 30 (shown in FIG. 2) to secure the female coupling components 28 to the free plate 24. An example can be found in U.S. application Ser. No. 14/665,250 filed Mar. 23, 2015 and titled MULTI-COUPLING WITH SERVICEABLE LOCKING MECHANISM, which is hereby incorporated by reference in its entirety.

The fixed plate 22 may include a guide pin 32 at each side of the fixed plate 22 for guiding the free plate 24 against the fixed plate 22 to align the female coupling components 28 to engage with the male coupling components 26. After engagement, the fixed plate 22 and the free plate 24 may lock together to prevent disengagement of the male coupling components 26 and the female coupling components 28.

Hydraulic lines (not shown) may fluidly connect to each of the male coupling components 26 and the female coupling components 28 to provide hydraulic fluid. For example, the hydraulic lines may provide hydraulic power to a corresponding oil well (not shown).

Figure 2:
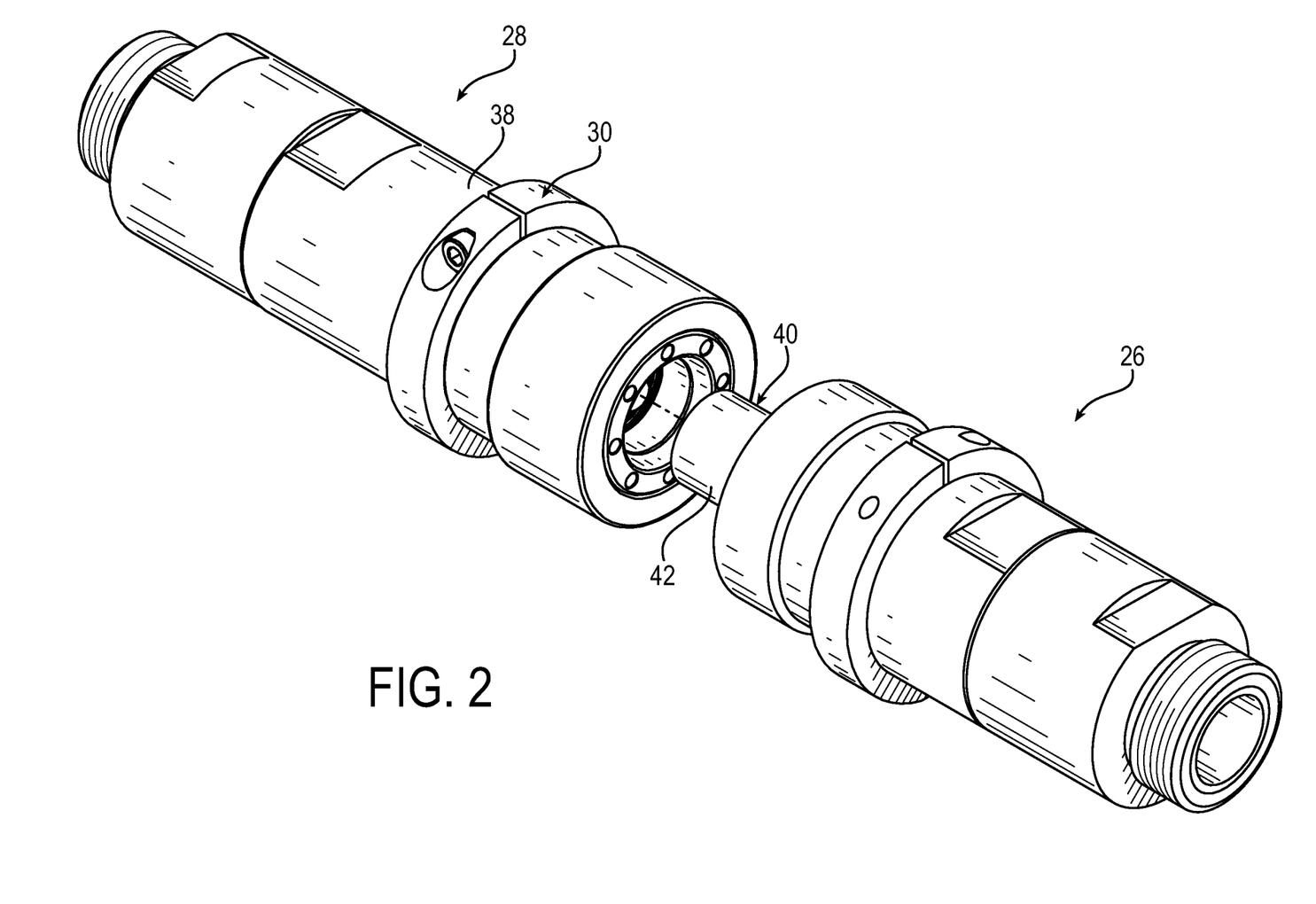
FIG. 2 is a perspective view of a male and female coupling component of FIG. 1.

FIG. 2 is a perspective view of one male coupling component 26, and one corresponding female coupling component 28 having a housing that includes a coupler body 38. The male coupling component 26 may include a nipple 40 having a radially outward facing surface 42 for engaging with an interior portion within the coupler body 38 of the female coupling component 28. When engaged, the radially outward facing surface 42 may seal against a radially inward facing surface of the female coupling component 28.

Figure 3:
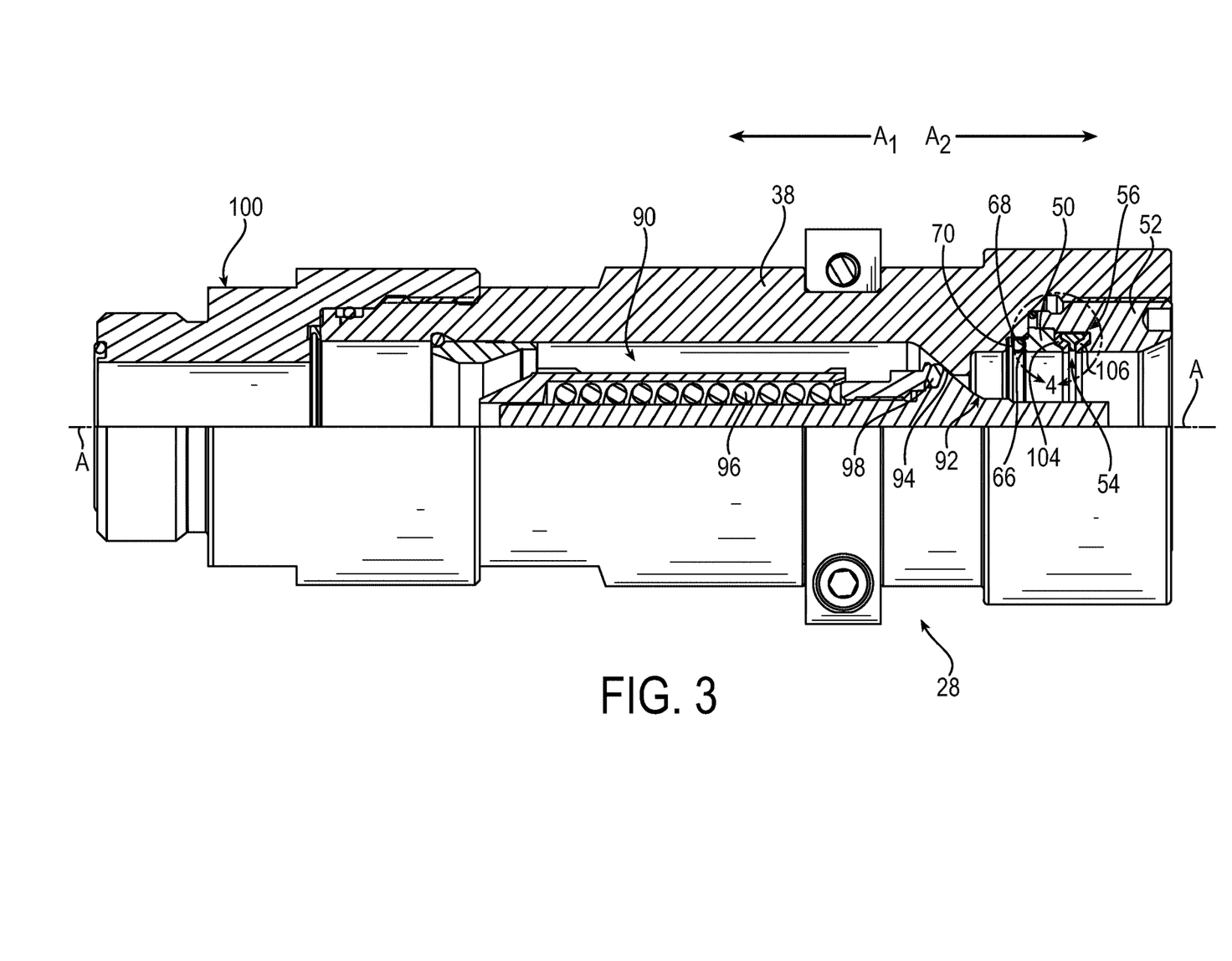
FIG. 3 is a side view of a partial cross-section of the female coupling component of FIG. 2 including an exemplary seal assembly.

FIG. 3 illustrates a partial cross-section of the female coupling component 28 extending along a longitudinal axis A. A housing of the female coupling component 28 may include a seal retainer 50 and a secondary retainer 52 that together define a backup seal cavity 54 for retaining a seal assembly 56.

The seal retainer 50 may include an axially facing retainer surface 66 with an axially facing concave portion 68 for securing a C-ring seal 70. An example can be found in PCT Application No. PCT/US2016/029964 filed Apr. 29, 2016 and titled AXIAL METAL SEAL RETAINER FOR IMPROVED FATIGUE RESISTANCE, which is hereby incorporated by reference in its entirety.

The coupler body 38 may include a flow cavity 90 for allowing fluid flow, along the longitudinal axis A, through the female coupling component 28. The female coupling component 28 may include a valve 92 and a valve seat 94 for engaging with the valve 92 to selectively restrict fluid flow through the flow cavity 90. Flow through the flow cavity 90 may be restricted when the female coupling component 28 and the male coupling component 26 (shown in FIG. 2) are disengaged. Also, flow through the flow cavity 90 may be allowed when the female coupling component 28 and the male couple component 26 are engaged.

The female coupling component 28 may further include a resilient member 96, such as a coil spring, and a valve seal 98, such as a ring seal. The resilient member 96 may induce the valve 92 and the valve seal 98 into a closed position against the valve seat 94. When in the closed position, the valve seal 98 may provide additional sealing engagement to prevent leakage of fluid between the valve 92 and the valve seat 94.

The female coupling component 28 may also include an adapter 100 at an axial end opposite the seal retainer 50. The adapter 100 may allow the female coupling component 28 to fluidly connect to a separate hydraulic line (not shown) or another hydraulic component (not shown) to allow fluid to flow through the flow cavity 90 and out the adapter 100 to the hydraulic line or the hydraulic component. Fluid may flow through a central opening in the adapter 100 to a central opening in the coupler body 38 where the fluid may flow radially outwardly about the valve 92 and follow a generally longitudinal path until reaching the valve seat 94. When the valve 92 moves in a first axial direction $A_1$ to open, the fluid may continue to follow a longitudinal path out of the coupler body 38. Alternatively, the fluid may flow in a second axial direction $A_2$, opposite the first axial direction $A_1$, from the hydraulic line or the hydraulic component through the adapter and further through the flow cavity.

Figure 4:
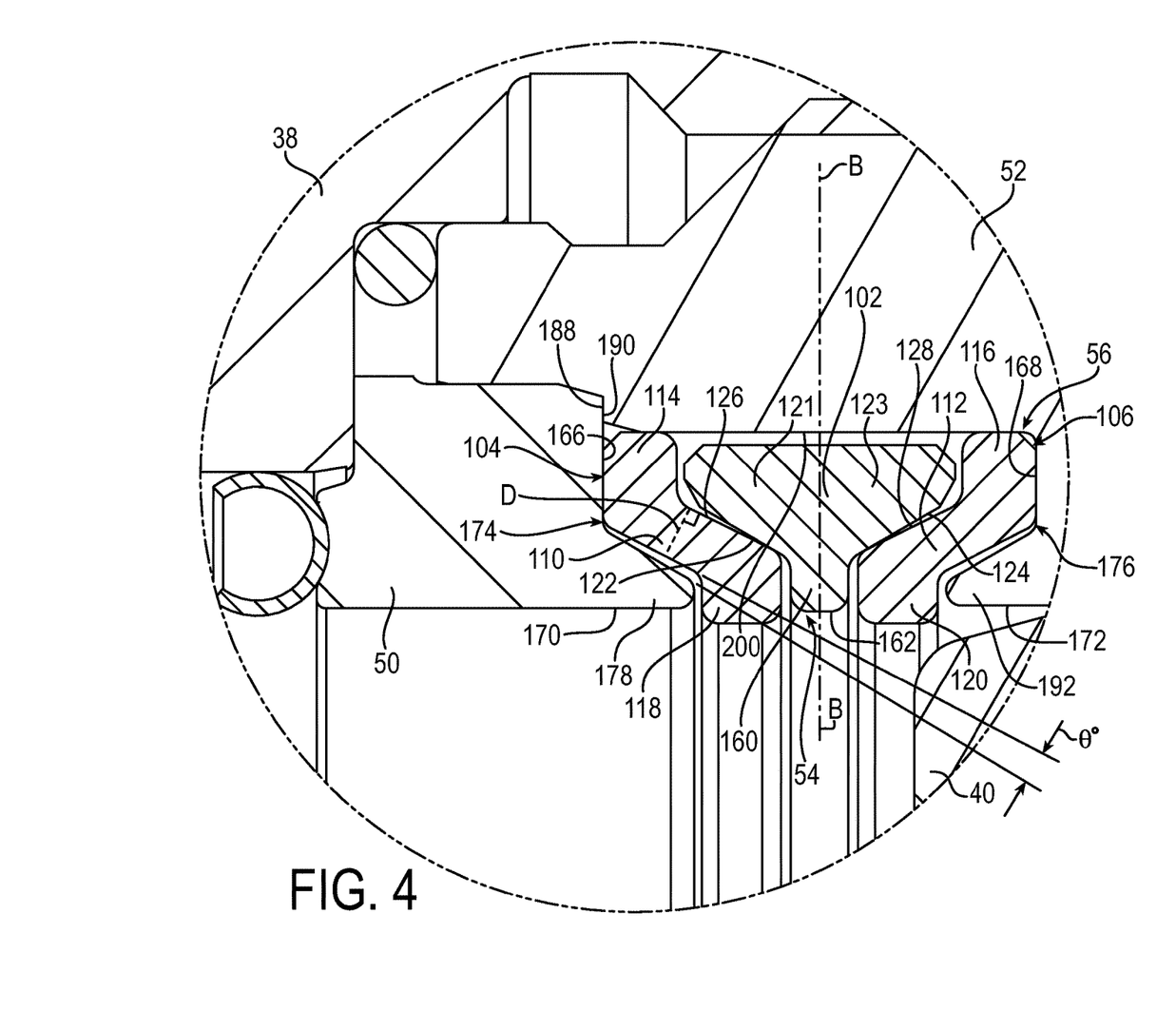
FIG. 4 is an enlarged side view of a portion of the partial cross-section of the female coupling component including the seal assembly of FIG. 3 in an uncompressed and unpressurized state, and of the male coupling component entering the female coupling component.

Referring now to FIG. 4, the seal assembly 56, the seal retainer 50, and the secondary retainer 52 are illustrated in further detail. The seal assembly 56 may include a wedging element 102 that is sandwiched between a pair of sealing members 104 and 106 that seal against the nipple 40. The sealing member 106 may be identical to the sealing member 104 and reversely oriented compared to the sealing member 104 such that the sealing members 104 and 106 are symmetrical relative to the bisection plane B that is transverse to the longitudinal axis A.

Figure 5:
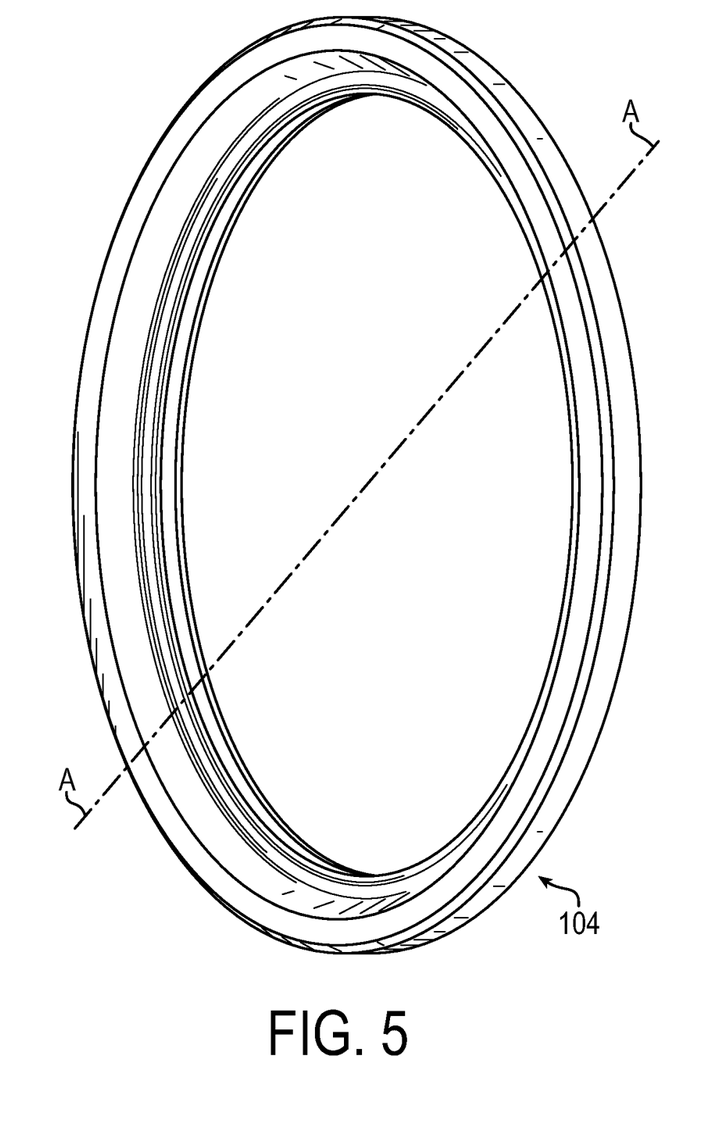
FIG. 5 is an isometric view of an exemplary sealing member of the seal assembly of FIG. 3.

Referring briefly to FIG. 5, the sealing member 104 may circumscribe the longitudinal axis A. The sealing member 104 may be circumferentially continuous about the longitudinal axis A to form a complete ring.

Referring again to FIG. 4, the sealing member 106 may similarly circumscribe the longitudinal axis A. For example, the sealing member 106 may be identical to the sealing member 104.

Each sealing member 104 and 106 respectively may include a central portion 110 and 112, a radially outwardly extending sealing leg 114 and 116, and a radially inwardly extending sealing leg 118 and 120. For example, a cross-section of the sealing members 104 or 106 having such components may be Z-shaped.

The wedging element 102 may be concentric with the sealing members 104 and 106. The wedging element 102 and the sealing members 104 and 106 may be concentric with the longitudinal axis A.

The wedging element may include a first axially extending wall 121 that forms a first wedging surface 122 and may include a second axially extending wall 123 that forms a second wedging surface 124. A radially outermost extent of each of the axially extending walls 121 and 123 may together form a continuous cylindrical radially outwardly facing surface. The radially outwardly facing surface may be resiliently expandable to engage the secondary retainer 52 when the sealing members 104 and 106 urge the corresponding wedging surface 122 or 124 radially outward.

Each wedging surface 122 and 124 may be engageable with a corresponding wedge engaging surface 126 or 128 formed respectively by the corresponding central portion 110 and 112. The wedging element 102 may be symmetrical with respect to a bisecting plane B that is transverse to the longitudinal axis A. In an alternative embodiment, the wedging element may be asymmetrical with respect to the bisecting plane B.

Engaging the first wedging surface 122 and the wedge engaging surface 126 may at least partially energize the sealing member 104. Similarly, engaging the second wedging surface 124 and the wedge engaging surface 128 may at least partially energize the sealing member 106.

Figure 6:
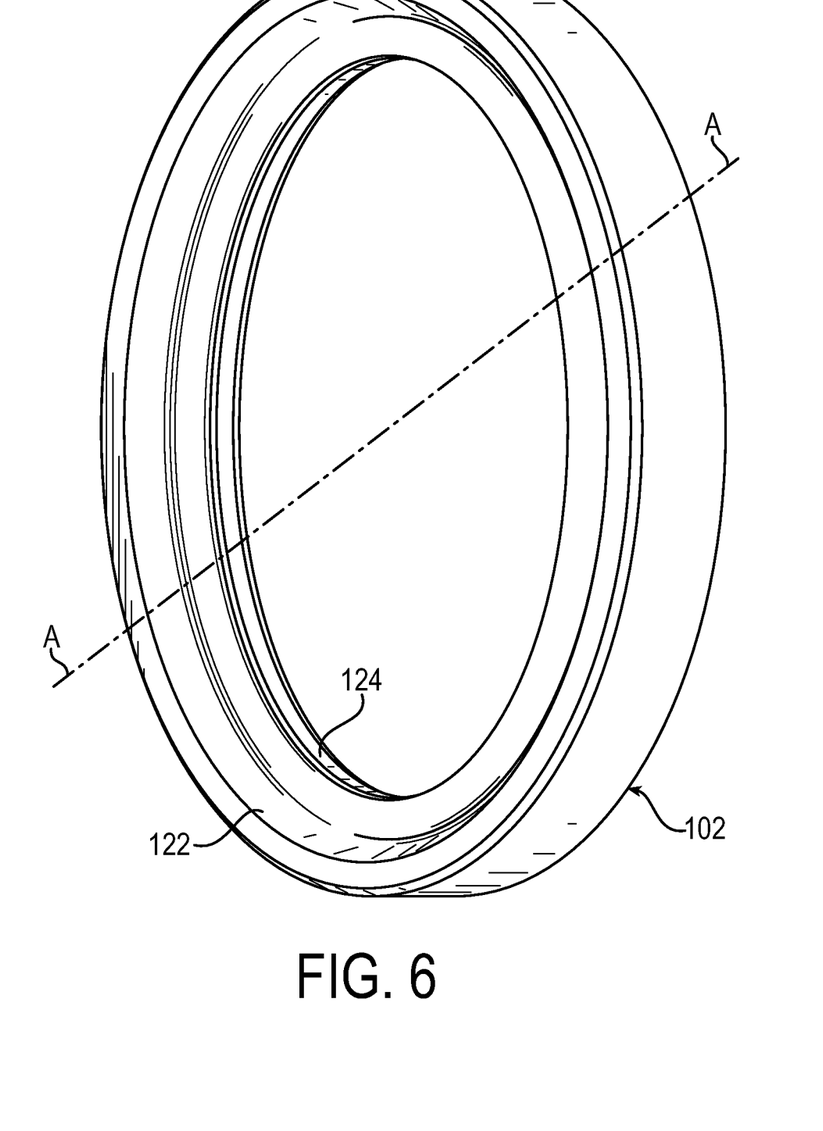
FIG. 6 is an isometric view of an exemplary wedging element of the seal assembly of FIG. 3.

Referring briefly to FIG. 6, the wedging element 102 may at least partially circumscribe the longitudinal axis A. For example, the wedging element 102 may entirely circumscribe the longitudinal axis A. The wedging element 102 may be circumferentially continuous about the longitudinal axis A to form a complete ring. In an alternative embodiment, the wedging element may not be circumferentially continuous about the longitudinal axis to reduce resistance to radial expansion.

The first wedging surface 122 and/or the second wedging surface 124 of the wedging element 102 may at least partially circumscribe the longitudinal axis A and extend in an inclined manner relative to the longitudinal axis A. For example, the first wedging surface 122 may form an angle with the longitudinal axis A that is greater than an angle of the corresponding wedge engaging surface 128 to form an angular mismatch. The angle of the first wedging surface 122 relative to the longitudinal axis A may be anywhere from 1° to 10° greater than the angle of the first wedge engaging surface 128 relative to the longitudinal axis A. Preferably, the angle of the first wedging surface 122 relative to the longitudinal axis A is 5° greater than the angle of the first wedge engaging surface 128 relative to the longitudinal axis A.

The first wedging surface 122 and/or the second wedging surface 124 may be expandable radially outwardly. For example, when a radially outward force urges the wedging surfaces radially outwardly, the wedging surface 122 and 124 may expand radially outwardly. After being expanded, the first wedging surface 122 and/or the second wedging surface 124 may retract radially inwardly when the radially outward force is reduced. For example, one or both of the wedging surfaces 122 and 124 may retract back to the size shown in FIG. 4.

Referring again to FIG. 4, the wedging element 102 may include a radially inwardly facing ridge 160. The radially inwardly facing ridge 160 may be adjacent to either or both of the radially inwardly extending sealing legs 118 and 120. For example, the radially inwardly facing ridge 160 may be engageable with the radially inwardly extending sealing legs 118 and 120 when the corresponding sealing member 104 or 106 is energized. In an alternative embodiment, the wedging element may not include a radially inwardly facing ridge.

The radially inwardly facing ridge 160 may be axially between the first wedging surface 122 and the second wedging surface 124. For example, an outer profile of a cross-section of the wedging element 102 may be funnel-shaped.

The radially inwardly facing ridge 160 may have a radial thickness that is anywhere from 20% to 50% of a radial thickness of the entire wedging element 102. The radial thickness of the radially inwardly facing ridge 160 may be anywhere from 20% to 50% of a radial thickness of the radially inwardly facing ridge 160 combined with the axially extending wall 121 or 123. The radial thickness of the radially inwardly facing ridge 160 may be anywhere from 25% to 45% of the radial thickness of the radially inwardly facing ridge 160 combined with the axially extending wall 121 or 123, optionally about 25%.

Relative to the radially inwardly extending sealing legs 118 or 120, the radially inwardly facing ridge 160 may extend radially inwardly anywhere from 80% to 100% the radial distance from a radially innermost end of the wedging surface 122 or 124 to the radially innermost portion of the radially inwardly extending sealing legs 118 or 120.

The radially inwardly facing ridge 160 may have an axial thickness that is anywhere from 10% to 40% of an axial thickness of the entire wedging element 102. The axial thickness of the radially inwardly facing ridge 160 may be anywhere from 10% to 40% an entire axial thickness of both the first axially extending wall 121 and the second axially extending wall 123, optionally about 20%.

Relative to the radially inwardly extending sealing legs 118 or 120, the radially inwardly facing ridge 160 may have an axial thickness anywhere from 50% to 100% an axial thickness of the radially inwardly extending sealing legs 118 or 120.

A radially innermost extent of the radially inwardly facing ridge 160 may form a radially inwardly facing surface 162. The radially inwardly facing surface 162 may be radially outwardly offset from a radially innermost extent of either or both of the radially inwardly extending sealing legs 118 and 120. Offsetting the radially inwardly facing surface 162 may prevent the radially inwardly facing surface 162 from engaging the nipple 40 when the nipple 40 is inserted into the female coupling component 28.

A diameter of the wedging element 102 may be resiliently expandable by anywhere from 1 to 5%. For example, the diameter of the radially inwardly facing surface 162 formed by the radially inwardly facing ridge 160 may be resiliently expandable by anywhere from 1% to 5%, preferably anywhere from 1 to 2%.

The wedging element 102 may be made of a resilient material to allow the wedging element to resiliently radially expand. The wedging element 102 may be made of any suitable material, such as plastic and/or metal. The wedging element 102 may be made of the same material as the sealing member 104, such as polyether ether ketone (PEEK). Alternatively, the wedging element 102 may be made of polytetrafluoroethylene (PTFE), metal, or any other suitable material.

A force required to resiliently expand the wedging element 102 may be proportional to an energizing force that the wedging element 102 applies to the sealing member 104. The force required to resiliently expand the wedging element 102 may be greater than a force required to expand the sealing member 104. For example, the force required to resiliently expand the wedging element 102 alone may be greater than a force required to radially outwardly expand the sealing legs 114 and 118 alone.

The sealing member 104 may be continuous from a radially outermost extent—formed by the radially outwardly extending sealing leg 114—directly radially inward through the central portion 110. The radially outermost extent may be axially offset in the first axial direction from a radially innermost extent that is formed by the radially inwardly extending sealing leg 118. The entire radially outwardly extending sealing leg 114 may be axially offset from the entire radially inwardly extending sealing leg 118. The axial spacing may reduce when the incline of the central portion 110 is increased, as discussed further below.

Axially offsetting the radially outwardly extending sealing leg 114 and the radially inwardly extending sealing leg 118 may provide axial space for the wedging element 102 to move into, as discussed further below.

The sealing legs 114-120 may be resilient to allow the sealing legs 114-120 to resiliently flex relative to the corresponding central portion 110 or 112 when energized. The sealing members 104 and 106 may be made of a plastic material, such as PEEK, PTFE (filled or unfilled), Acetal (i.e., Polyoxymethylene), or a rubber compound.

The central portion 110 may extend in the second axial direction from a radially inner end of the radially outwardly extending sealing leg 114 to a radially outer end of the radially inwardly extending sealing leg 118. The central portion 110 may form the wedge engaging surface 126

The wedge engaging surface 126 may extend in an inclined manner relative to the longitudinal axis A. For example, the wedge engaging surface 126 may be frusto-conical.

A thickness of the central portion 110 may be defined by a shortest distance D between the wedge engaging surface 126 and an opposite radially inwardly facing surface. The thickness of the central portion 110 may be anywhere from 80% and 110% an axial thickness of the first radially outwardly extending sealing leg.

An axial thickness of a thickest portion of the radially inwardly extending sealing leg 118 may be anywhere from 80% to 110% an axial thickness of a thickest portion of the radially outwardly extending sealing leg 114.

The axial thickness of the thickest portion of the radially inwardly extending sealing leg may be anywhere from 80% to 110% a thickness of a thickest portion of the central portion 110.

The radially outwardly extending sealing leg 114 and the radially inwardly sealing leg 118 may extend perpendicular to the longitudinal axis A. When the sealing member 104 is energized, the radially outwardly extending sealing leg 114 and/or the radially inwardly sealing leg 118 may become non-perpendicular to the longitudinal axis A.

The sealing member 104, the wedging element 102, and the sealing member 106 may be disposed within the backup seal cavity 54. The backup seal cavity 54 may be defined by a pair of axially spaced and opposing axially facing surfaces 166 and 168 extending radially outward from radially inward facing surfaces 170 and 172 that are configured to receive the nipple 40. Each axially facing surface 166 and 168 may form an axially facing concave portion 174 and 176 that is configured to receive the corresponding radially outwardly extending sealing leg 114 or 116. The backup seal cavity 54 may be symmetrical with respect to the bisecting plane B.

The seal retainer 50 may be axially retained against the coupler body 38 by the secondary retainer 52 that may be fixed to the coupler body 38. For example, threading on a radially outwardly facing surface of the secondary retainer 52 may engage radially inwardly facing threads of the coupler body 38 to secure the secondary retainer 52 to the coupler body 38, and thereby retain the seal retainer 50. Alternatively, the secondary retainer 52 may be fixed to the coupler body 38 in any other suitable manner, such as press-fitting the secondary retainer into the coupler body 38.

The seal retainer 50 may be fixed at an end of the coupler body 38 that receives the nipple 40. The position of the seal retainer 50 may allow the seal retainer 50 to limit axial movement of the seal assembly 56 in the first axial direction $A_1$ toward the seal retainer 50 when the seal assembly 56 is seated in the backup seal cavity 54. The seal retainer 50 may include a foot 178 for securing the seal assembly 56 between the seal retainer 50 and the secondary retainer 52. The foot 178 may be engageable with the corresponding radially inwardly extending sealing leg 118 of the adjacent sealing member 104.

The seal retainer 50 may form a ring about the longitudinal axis A. The seal retainer 50 may form the radially inwardly facing surface 170, which may be cylindrical and coaxial with the longitudinal axis A for receiving the male coupler component 28 (FIG. 11).

The foot 178 may be disposed at a radially inner end of the seal retainer 50. The foot 178 is illustrated as extending axially along the longitudinal axis A, in a second axial direction $A_2$ opposite. For example, the foot 178 may form a ring about the longitudinal axis A that extends from a radially innermost portion of a central portion of the seal retainer 50. The central portion of the seal retainer 50 may form a radially inwardly facing surface that is cylindrical and continuous with the radially inwardly facing surface 170. Alternatively, the radially inwardly facing surfaces may be another suitable shape.

The foot 178 may be any suitable shape for retaining the seal assembly 56. For example, the foot 178 may be tapered to accommodate the seal assembly 56, and to prevent radially inward movement of the seal assembly 56. In an embodiment, the seal retainer does not include a foot 178.

The foot 178 may form an angular mismatch of θ° with a radially inwardly facing surface of the central portion 110 to ensure that the central portion 110 diverges radially away from the foot 178. The angular mismatch of θ° may allow the radially inwardly sealing leg 118 to increase or maintain radially inward sealing force by reducing a force that may urge the radially inward sealing leg 118 radially outwardly when pressurized.

A radially outwardly facing surface of the foot 178 may extend in an inclined manner relative to the longitudinal axis A. A radially inwardly facing surface of the central portion 110 may extend in an inclined manner relative to the longitudinal axis A at an angle less than the radially outwardly facing surface of the foot 178 to form the angular mismatch of θ°. The angular mismatch of θ° may be anywhere above 0° up to 5°, optionally 2°. In an alternative embodiment, an angular mismatch is not included and the central portion may be parallel to the radially outwardly facing surface of the foot.

The secondary retainer 52 may be a ring shape, coaxial with the longitudinal axis A, with an axially facing surface 188 for engaging an opposing axially facing surface 190 of the seal retainer 50. The axially facing surface 188 of the secondary retainer 52 and the coupler body 38 may, along the longitudinal axis A, sandwich the seal retainer 50 to axially fix the seal retainer 50 to the coupler body 38 and/or to the secondary retainer 52.

The seal retainer may include a radially inwardly facing surface 200 that partially defines the backup seal cavity 54. The radially inwardly facing surface 200 may form a radially outermost extent of the backup seal cavity 54 to engage the radially outward extending legs 114 and 116.

Similar to the seal retainer 50, the secondary retainer 52 may include a foot 192. The foot 192, similar to the foot 178, may be disposed at a radially inner end of the secondary retainer 52. The foot 192 may be identical to the foot 178 and oriented diametrically opposite the foot 178 relative to the bisecting plane B.

The foot 192 is illustrated as extending axially along the longitudinal axis A, in the first axial direction opposite the foot 178. The foot 192 may form a ring about the longitudinal axis A that extends from a radially innermost portion of a central portion of the secondary retainer 52.

The foot 192 may be any suitable shape for retaining the seal assembly 56. For example, the foot 192 may be tapered to accommodate the seal assembly 56, and to prevent radially inward movement of the seal assembly 56. In an embodiment, the seal retainer does not include a foot 192.

Figure 7:
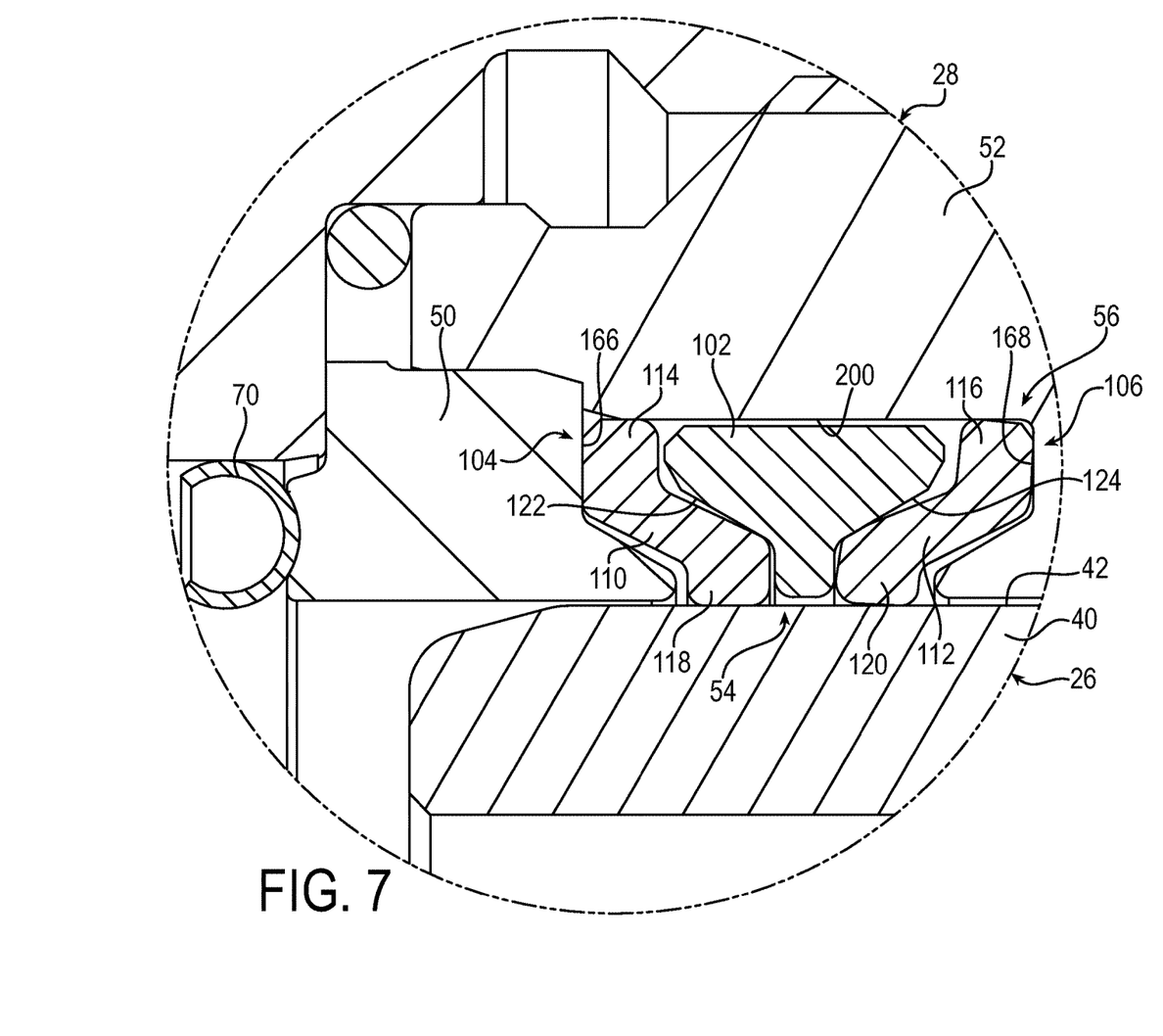
FIG. 7 is an enlarged side view of a portion of the partial cross-section of the female coupling component including the seal assembly of FIG. 3 in a radially compressed state, and of the male coupling component partially within the female coupling component and engaged with the seal assembly.

FIGS. 4, and 7-9 show a progression of the seal assembly throughout assembly and during use when pressurization by an external fluid. As shown in FIGS. 4 and 7, the seal assembly 56 may have a maximum axial length when in an unpressurized state. For example, the seal assembly 56 may axially span the backup seal cavity 54 (e.g., an axial length of the seal assembly 56 may be equal to an axial length of the backup seal cavity 54) when the seal assembly 56 is not pressurized. The radially outward extending leg 114 of the sealing member 104 may abut the axially facing surface 166 of the seal retainer 50, and the radially outward extending leg 116 of the sealing member 106 may abut the axially facing surface 168 of the secondary retainer 52.

When the seal assembly 56 is fluidly energized, the axial length of the seal assembly 56 may be less than the axial length of the backup seal cavity 54, as discussed further below.

Referring now to FIG. 7, the seal assembly 56 is illustrated in the radially compressed state where the radially outwardly facing surface 42 of the nipple 40 engages the radially inwardly extending sealing legs 118 and 120. When engaged, the sealing members 104 and 106 may seal against the radially outwardly facing surface 42 of the nipple 40 of the male coupling component 26 and against the radially inwardly facing surface 200. The nipple 40 may move to an intermediate position where the radially inwardly extending sealing legs 118 and 120 abut the radially outward facing surface 40.

Abutting the radially inwardly extending sealing legs 118 and 120 and the radially outward facing surface 40 may urge the radially inwardly extending sealing legs 118 and 120 radially outward. The radially outward urging may cause the radially inwardly extending sealing legs 118 and 120 to expand radially outwardly. The radially outward expansion may urge each central portion 110 and 112 radially outward, which may cause each central portion 110 and 112 to pivot relative to the corresponding radially outwardly extending sealing legs 114 and 116.

Radially outwardly urging the central portions 110 and 112 may cause an axial end each central portion 110 and 112 to expand radially outwardly against the corresponding wedging surface 122 or 124 of the wedging element 102. The radial expansion may cause the wedging surfaces 122 and 124 to expand radially outwardly. For example, the entire wedging element 102 may expand radially outwardly, which may tension the wedging element 102 to create a radially inward biasing force against the central portions 110 and 112.

The radially inwardly facing surface 200 of the secondary retainer 52 may limit radial expansion of the wedging element 102. For example, the wedging element 102 may expand anywhere from 1% to 5% until a radially outer most extent of the wedging element 102 abuts the radially inwardly facing surface 200. The wedging surfaces 122 and 124 may continue to radially expand after the wedging element 102 abuts the radially inwardly facing surface 200. For example, the radial thickness of wedging element 102 may be reduced.

The nipple 40 may continue to move axially beyond the seal assembly 56 toward the C-ring seal 70. While the nipple 40 moves, the radially inwardly extending sealing legs 118 and 120 may slide against the radially outward facing surface 42.

The sealing force of the radially inwardly extending sealing legs 118 and 120 may be based on the radially inward tension force of the wedging element 102. The sealing force may be independent of the pressure of the sea water while the coupling components 26 and 28 are closed. The same or substantially the same pressure may surround the radially inwardly extending sealing legs 118 and 120 while the coupling components 26 and 28 are closed. Surrounding each radially inwardly extending sealing leg 118 and 120 with the same or substantially the same pressure may allow the sealing force to be relatively low while the pressure of the sea water is relatively high.

When the nipple 40 is removed, the seal assembly 56 may return to an uncompressed state (shown in FIG. 4). The radially inwardly extending sealing legs 118 and 120 may radially decompress toward the longitudinal axis A to or substantially to the uncompressed state shown in FIG. 4.

Figure 8:
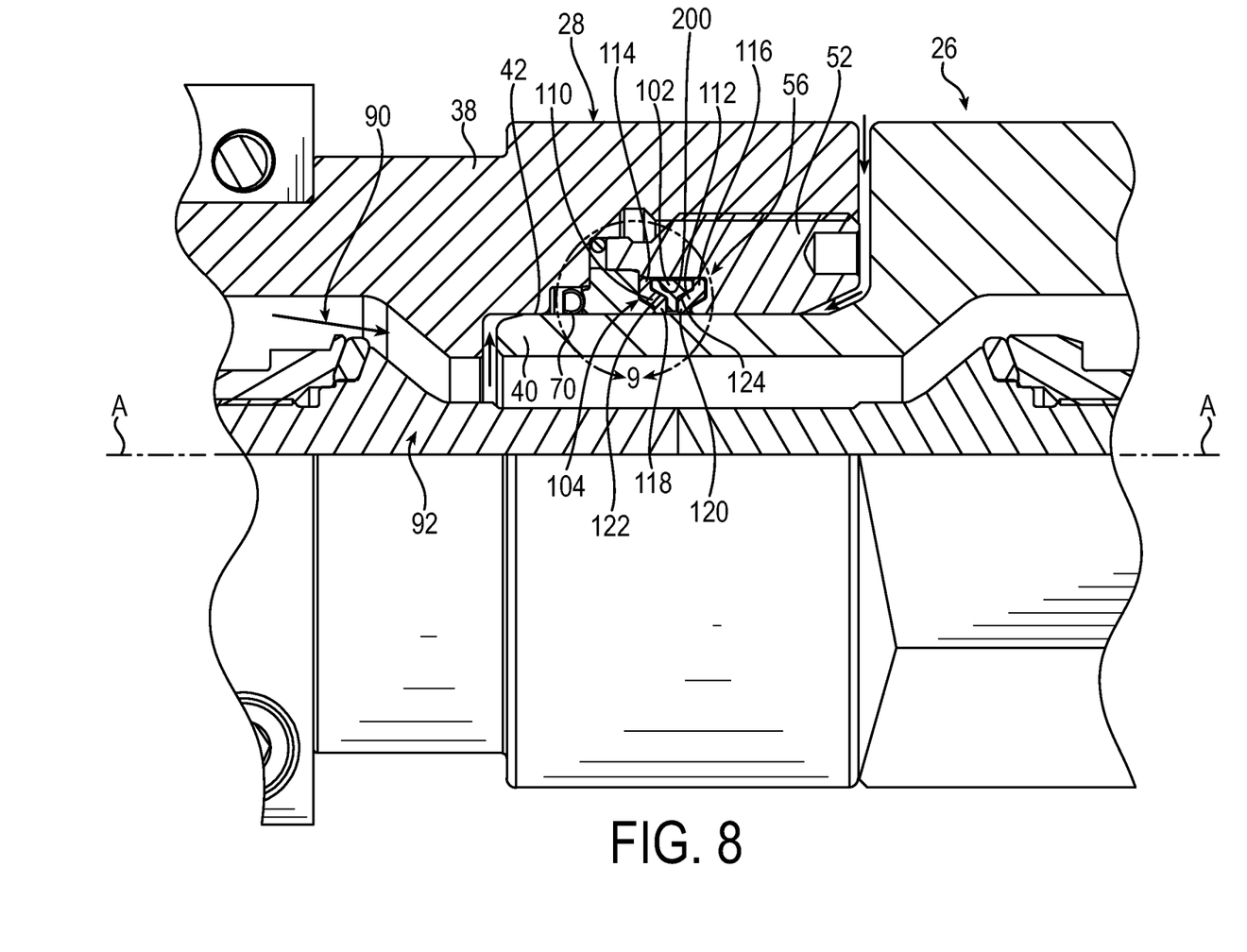
FIG. 8 is an enlarged side view of a partial cross-section of the female coupling component of FIG. 3 and the male coupling component engaged with the female coupling component.

Referring now to FIG. 8, the male coupling component 26 may be engaged with the female coupling component 28 to open the valve 92, thereby allowing hydraulic fluid to flow through the flow cavity 90. When the fluid flows, pressure in the fluid may force some of the fluid between the radially outward facing surface 42 and the coupler body 38.

In some situations, the fluid may flow beyond the C-ring seal 70 in the second axial direction to reach the seal assembly 56. An axial force created by the pressure of the fluid may be proportional to a radially inward sealing force of the radially inwardly extending sealing leg 118 and to a radially outward sealing force of the radially outwardly extending sealing leg 114. For example, when the fluid reaches the seal assembly 56, the fluid may urge the seal assembly 56 in the second axial direction, thereby increasing a sealing force of the seal assembly 56 against the radially outward facing surface 42 and the radially inwardly facing surface 200 of the secondary retainer 52.

The pressure of the fluid may energize the seal assembly 56 to increase the sealing force. The fluid may move beyond the C-ring seal 70 to reach the sealing member 104. The fluid may urge the sealing member 104 axially toward the wedging element 102 with an axial force based on the pressure of the fluid.

When urged axially together, the wedging element 102 may drive the radially inwardly extending sealing leg 118 radially inwardly to seal against the radially outwardly facing surface 42 of the nipple 40. The first wedging surface 122 may urge the corresponding central portion 110 and the corresponding radially inwardly extending sealing leg 118 radially inward to seal against the radially outward facing surface 42.

When driving the radially inwardly extending sealing leg 118 radially inward, the radially outwardly extending sealing leg 114 may be driven radially outward to seal against the radially inwardly facing surface 200. The fluid may urge the central portion 110 radially outward to urge the radially outwardly extending sealing leg 114 radially outward against the radially inwardly facing surface 200.

The pressure may be anywhere from 0 pounds per square inch absolute (psia) to 20,000 psia. In some embodiments, the pressure may above 20,000 psia.

An external fluid, such as sea water, may flow between the male coupling component 26 and the secondary retainer 52 in the first axial direction to reach the seal assembly 56. The pressure of the fluid may energize the seal assembly 56 to increase the sealing force the seal assembly 56 against the radially outward facing surface 42 and the radially inwardly facing surface 200. The external fluid may urge the sealing member 106 axially toward the wedging element 102 with an axial force based on the pressure of the external fluid.

When urged axially together, the wedging element 102 may drive the radially inwardly extending sealing leg 120 radially inwardly to seal against the radially outwardly facing surface 42 of the nipple 40. The second wedging surface 124 may urge the corresponding central portion 112 and the corresponding radially inwardly extending sealing leg 120 radially inward to seal against the radially outward facing surface 42.

When driving the radially inwardly extending sealing leg 120 radially inward, the radially outwardly extending sealing leg 116 may be driven radially outward to seal against the radially inwardly facing surface 200. The fluid may urge the central portion 112 radially outward to urge the radially outwardly extending sealing leg 116 radially outward.

The external fluid pressure may be anywhere from 0 psia to 5,000 psia. In some embodiments, the external fluid pressure may above 5,000 psia.

Figure 9:
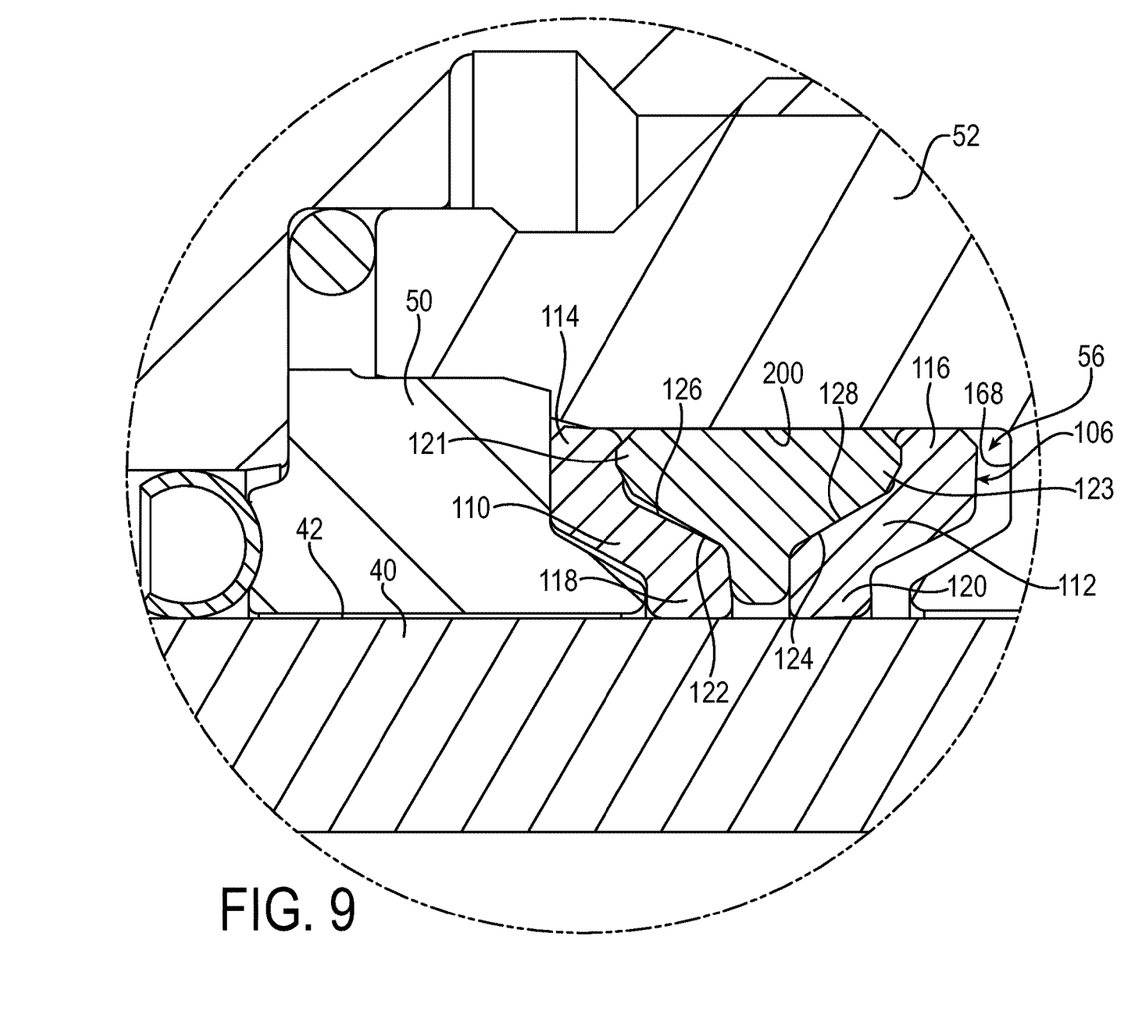
FIG. 9 is an enlarged side view of a partial cross-section of the female coupling component of FIG. 8 and the male coupling component engaged with the female coupling component with the seal assembly in a pressurized state due to a relatively high external fluid pressure.

Referring now to FIG. 9, the high fluid pressure may be intermittent, which may allow the external fluid to axially compress the seal assembly 56 against the seal retainer 50. When the hydraulic fluid pressure is below the pressure of the external fluid, the external fluid may urge the seal assembly 56 in the first axial direction. Urging the seal assembly 56 in the first axial direction may axially compress the seal assembly 56 against the seal retainer 50 and increase a sealing force of each leg 114-120 against the radially outward facing surface 42 and the radially inwardly facing surface 200 of the secondary retainer 52. The relatively high pressure external fluid may urge the wedge engaging surface 128 of the sealing member 106 against the wedging surface 124.

The wedging surface 124 may drive the wedge engaging surface 128 and the corresponding radially inwardly extending sealing leg 120 radially inward against the radially outward facing surface 42. The external fluid may drive the central portion 112 radially outward to drive the corresponding radially outwardly extending sealing leg 116 radially outward against the radially inwardly facing surface 200. A radially outwardly facing surface of the radially outwardly extending sealing leg 116 may slide in the first axial direction against the radially inwardly facing surface 200. A radially inwardly facing surface of the radially inwardly extending sealing leg 120 may slide in the first axial direction against the radially outwardly facing surface 42 of the nipple 40.

The axially extending wall 121 may axially compress the radially outwardly extending sealing leg 114 when the wedging element 102 moves axially in the first direction. An axial most extent in the first direction of the axially extending wall 121 and the seal retainer 50 may sandwich the radially outwardly extending sealing leg 114. The sandwiching may axially compress the radially outwardly extending sealing leg 114 to increase sealing force of the radially outwardly extending sealing leg 114 against the radially inwardly facing surface 200.

The external fluid pressure may axially compress the radially outwardly extending sealing leg 116 when the external fluid pressure moves the sealing member 106 axially in the first direction. An axial most extent in the second direction of the axially extending wall 123 and the external fluid pressure may sandwich the radially outwardly extending sealing leg 116. The sandwiching may axially compress the radially outwardly extending sealing leg 116 to increase sealing force of the radially outwardly extending sealing leg 116 against the radially inwardly facing surface 200.

When the hydraulic fluid pressure is higher than the external fluid pressure, the hydraulic fluid pressure may axially compress the seal assembly 56 against the axially facing surface 168 of the secondary retainer 52 and increase a sealing force of each leg 114-120 against the radially outward facing surface 42 and the radially inwardly facing surface 200. When the seal assembly 56 is compressed against the axially facing surface 168, the seal assembly 56 may be a mirrored version of the seal assembly 56 illustrated in FIG. 9 with the legs 116 and 120 abutting the secondary retainer 52. For example, the relatively high pressure hydraulic fluid may urge the wedge engaging surface 126 of the sealing member 104 against the wedging surface 122.

The wedging surface 122 may drive the wedge engaging surface 126 and the corresponding radially inwardly extending sealing leg 118 radially inward against the radially outward facing surface 42. The hydraulic fluid may drive the central portion 110 and the corresponding radially outwardly extending sealing leg 114 radially outward against the radially inwardly facing surface 200. A radially outwardly facing surface of the radially outwardly extending sealing leg 114 may slide in the second axial direction against the radially inwardly facing surface 200. A radially inwardly facing surface of the radially inwardly extending sealing leg 118 may slide in the second axial direction against the radially outwardly facing surface 42.

The hydraulic fluid pressure may axially compress the radially outwardly extending sealing leg 114 when the external fluid pressure moves the sealing member 104 axially in the second direction. The axial most extent in the first direction of the axially extending wall 121 and the hydraulic fluid pressure may sandwich the radially outwardly extending sealing leg 114.

The axially extending wall 123 may axially compress the radially outwardly extending sealing leg 116 when the wedging element 102 moves axially in the second direction. The axial most extent in the second direction of the axially extending wall 123 and the secondary retainer 52 may sandwich the radially outwardly extending sealing leg 116.

When the pressure on both axial sides of the seal assembly 56 is reduced, the seal assembly 56 may return to an unpressurized state (shown in FIG. 7). The sealing members 104 and 106 may move axially away from each other to or substantially to the unpressurized state shown in FIG. 7.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A seal assembly including:
a first sealing member circumscribing a longitudinal axis, wherein the first sealing member includes a first central portion extending axially in a first direction from a radially inner end of a first radially outwardly extending sealing leg to a radially outer end of a first radially inwardly extending sealing leg, and wherein the first central portion forms a first wedge engaging surface that faces radially outwardly;
a wedging element that at least partially circumscribes the longitudinal axis, wherein the wedging element includes a first wedging surface that is engageable with the first wedge engaging surface, and wherein the first wedging surface faces radially inwardly and extends in an inclined manner relative to the longitudinal axis; and
a second sealing member circumscribing the longitudinal axis, wherein the second sealing member includes a second central portion extending axially in a second direction toward the first sealing member from a radially inner end of a second radially outwardly extending sealing leg to a radially outer end of a second radially inwardly extending sealing leg, and wherein the second central portion forms a second wedge engaging surface that faces radially outwardly;
wherein the wedging element includes a second wedging surface that is engageable with the second wedge engaging surface, and the second wedging surface faces radially inwardly and extends in an inclined manner relative to the longitudinal axis;

wherein when the seal assembly is in an uncompressed state, a radially outermost extent of the first radially outwardly extending sealing leg is axially offset from the entire wedging element and the first wedging surface is engaged with the first wedge engaging surface, and a radially outermost extent of the second radially outwardly extending sealing leg is axially offset from the entire wedging element and the second wedging surface is engaged with the second wedge engaging surface;

wherein when the seal assembly is in a radially compressed state, a radially innermost extent of the first radially inwardly extending sealing leg is radially outward of a position of the radially innermost extent when the seal assembly is in the uncompressed state, and a radially innermost extent of the second radially inwardly extending sealing leg is radially outward of a position of the radially innermost extent when the seal assembly is in the uncompressed state;

wherein when the seal assembly is in the radially compressed state and the first sealing member and the wedging element are urged together, the wedging element engages the first wedge engaging surface to urge the first radially inwardly extending sealing leg radially inwardly, whereby when a first pressure urges the sealing member in the first direction, an axial length of the seal assembly is reduced, the first pressure is proportional to a radially inward sealing force of the first radially inwardly extending sealing leg, and the first pressure is proportional to a radially outward sealing force of the first radially outwardly extending sealing leg; and wherein when the seal assembly is in the radially compressed state and the second sealing member and the wedging element are urged together, the wedging element engages the second wedge engaging surface to urge the second radially inwardly extending sealing leg radially inwardly, whereby when a second pressure urges the sealing member in the second direction, an axial length of the seal assembly is reduced, the second pressure is proportional to a radially inward sealing force of the second radially inwardly extending sealing leg, and the second pressure is proportional to a radially outward sealing force of the second radially outwardly extending sealing leg.

2. The seal assembly of claim 1, wherein the seal assembly is in the uncompressed state, the radially outermost extent of the first radially outwardly extending sealing leg is axially offset from the entire wedging element, and the first wedging surface is engaged with the first wedge engaging surface.

3. The seal assembly of claim 1, wherein the seal assembly is in the radially compressed state and the radially innermost extent of the radially inwardly extending sealing leg is radially outward of the position of the radially innermost extent when the seal assembly is in the uncompressed state.

4. The seal assembly of claim 1, wherein the seal assembly is in the radially compressed state and the first sealing member and the wedging element are urged together, the wedging element engages the first wedge engaging surface to urge the first radially inwardly extending sealing leg radially inwardly; and wherein the first pressure urges the first sealing member in the first direction, the axial length of the seal assembly is reduced, the first pressure is proportional to the radially inward sealing force of the first radially inwardly extending sealing leg, and the first pressure is proportional to the radially outward sealing force of the first radially outwardly extending sealing leg.

5. The seal assembly of claim 1, wherein the wedging element includes a radially inwardly facing ridge adjacent to the first radially inwardly extending sealing leg.

6. The seal assembly of claim 5, wherein a radially inwardly facing surface formed by the radially inwardly facing ridge is radially outwardly offset from the radially innermost extent of the first radially inwardly extending sealing leg.

7. The seal assembly of claim 1, wherein the wedging element further includes a second wedging surface opposite the first wedging surface, wherein the second wedging surface faces radially inwardly and extends in an inclined manner relative to the longitudinal axis.

8. The seal assembly of claim 1, wherein the sealing legs are resilient, thereby allowing the sealing legs to resiliently flex relative to the first central portion when energized.

9. The seal assembly of claim 1, wherein the seal assembly is in the radially compressed state and the second sealing member and the wedging element are urged together, the wedging element engages the second wedge engaging surface to urge the second radially inwardly extending sealing leg radially inwardly; and wherein the second pressure urges the second sealing member in the second direction, the axial length of the seal assembly is reduced, the second pressure is proportional to the radially inward sealing force of the second radially inwardly extending sealing leg, and the second pressure is proportional to the radially outward sealing force of the second radially outwardly extending sealing leg.

10. A hydraulic coupling including:

a female hydraulic coupling component and a male hydraulic coupling component engaged with the female hydraulic coupling component, wherein the female hydraulic coupling component includes:

a housing having a seal cavity, having an opening configured to receive the male hydraulic coupling component, and having a flow cavity fluidly connectable to the opening and extending along a longitudinal axis;

the seal assembly of any one of claims 1-9 disposed within the seal cavity;

wherein the seal cavity is defined by a pair of axially spaced and opposing axially facing surfaces extending radially outward from a radially inward facing surface that is configured to receive a radially outwardly facing surface of the male hydraulic coupling component, wherein each axially facing surface forms an axially facing concave portion that is configured to receive an axially outward facing surface of the seal assembly.

11. The hydraulic coupling of claim 10, wherein the housing further includes:

a valve seat surrounding a portion of the flow cavity; and wherein the hydraulic coupling further includes:

a valve member moveable within the flow cavity, the valve member being moveable between a closed position and an open position, when in the closed position the valve member is engaged with the valve seat to prevent flow through the flow cavity, and when in the open position the valve member is spaced from the valve seat to allow fluid to flow through the flow cavity.

12. The hydraulic coupling of claim 10, wherein each axially facing surface is partially formed by an axially protruding foot that is engageable with the corresponding radially inwardly extending sealing leg of the adjacent sealing member.

13. The hydraulic coupling of claim 10, wherein when the seal assembly is not fluidly energized, the axial length of the seal assembly is equal to an axial length of the seal cavity; and wherein when the seal assembly is fluidly energized, the axial length of the seal assembly is less than the axial length of the seal cavity.

14. A seal assembly including:
a first sealing member circumscribing a longitudinal axis, wherein the first sealing member includes a first central portion extending axially in a first direction from a radially inner end of a first radially outwardly extending sealing leg to a radially outer end of a first radially inwardly extending sealing leg, and wherein the first central portion forms a first wedge engaging surface that faces radially outwardly; and
a wedging element that at least partially circumscribes the longitudinal axis (A), wherein the wedging element includes a first wedging surface that is engageable with the first wedge engaging surface, and wherein the first wedging surface faces radially inwardly and extends in an inclined manner relative to the longitudinal axis;
wherein when the seal assembly is in an uncompressed state, a radially outermost extent of the first radially outwardly extending sealing leg is axially offset from the entire wedging element and the first wedging surface is engaged with the first wedge engaging surface;
wherein when the seal assembly is in a radially compressed state, a radially innermost extent of the first radially inwardly extending sealing leg is radially outward of a position of the radially innermost extent when the seal assembly is in the uncompressed state;
wherein when the seal assembly is in the radially compressed state and the first sealing member and the wedging element are urged together, the wedging element engages the first wedge engaging surface to urge the first radially inwardly extending sealing leg radially inwardly, whereby when a pressure urges the sealing member in the first direction, an axial length of the seal assembly is reduced, the pressure is proportional to a radially inward sealing force of the first radially inwardly extending sealing leg, and the pressure is proportional to a radially outward sealing force of the first radially outwardly extending sealing leg; and
wherein the entire radially inwardly extending sealing leg is axially offset in the first direction from the entire radially outwardly extending sealing leg.

* * * * *